(12) United States Patent
Lee et al.

(10) Patent No.: US 12,080,480 B2
(45) Date of Patent: Sep. 3, 2024

(54) MULTILAYER CAPACITOR

(71) Applicant: SAMSUNG ELECTRO-MECHANICS CO., LTD., Suwon-si (KR)

(72) Inventors: Dae Hee Lee, Suwon-si (KR); Soo Jeong Jo, Suwon-si (KR); Kang Ha Lee, Suwon-si (KR); Yoon A Park, Suwon-si (KR); Jin Woo Chun, Suwon-si (KR); Berm Ha Cha, Suwon-si (KR); Myung Jun Park, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 87 days.

(21) Appl. No.: 17/888,909

(22) Filed: Aug. 16, 2022

(65) Prior Publication Data

US 2023/0108431 A1 Apr. 6, 2023

(30) Foreign Application Priority Data

Oct. 1, 2021 (KR) .......................... 10-2021-0131027

(51) Int. Cl.
*H01G 4/008* (2006.01)
*H01G 4/30* (2006.01)

(52) U.S. Cl.
CPC ............. *H01G 4/0085* (2013.01); *H01G 4/30* (2013.01)

(58) Field of Classification Search
CPC ........ H01G 4/30; H01G 4/0085; H01G 4/232; H01G 2/065; H01G 4/012; H01G 4/1227; H01G 4/224; H01G 4/33; H01G 13/00; H01G 4/2325; H01G 4/008; H01G 4/12; H01G 4/228; H01G 4/248
See application file for complete search history.

(56) References Cited

U.S. PATENT DOCUMENTS

| | | | |
|---|---|---|---|
| 2004/0256603 A1* | 12/2004 | Celik | H01G 4/0085 252/500 |
| 2016/0268046 A1 | 9/2016 | Nishisaka et al. | |
| 2018/0061577 A1 | 3/2018 | Yasuda | |
| 2019/0355518 A1* | 11/2019 | Harada | H01G 4/30 |
| 2019/0371526 A1 | 12/2019 | Ubukata et al. | |
| 2020/0411248 A1* | 12/2020 | Hashimoto | H01G 4/008 |

(Continued)

FOREIGN PATENT DOCUMENTS

| | | |
|---|---|---|
| JP | 2016-171310 A | 9/2016 |
| JP | 2018-37473 A | 3/2018 |

(Continued)

*Primary Examiner* — Michael P McFadden
(74) *Attorney, Agent, or Firm* — Morgan, Lewis & Bockius LLP

(57) ABSTRACT

A multilayer capacitor includes a body including a dielectric layer and a plurality of internal electrodes stacked on one another with the dielectric layer interposed therebetween, and external electrodes disposed externally on the body, and each connected to the plurality of internal electrodes, wherein at least one of the plurality of internal electrodes includes an alloy region formed in a region in contact with a corresponding external electrode of the external electrodes, and the alloy region includes a nickel (Ni)-chromium (Cr) alloy.

13 Claims, 4 Drawing Sheets

(56) References Cited

U.S. PATENT DOCUMENTS

| | | | |
|---|---|---|---|
| 2021/0035744 A1 | 2/2021 | Atsumi et al. | |
| 2021/0151252 A1 | 5/2021 | Nakamura et al. | |
| 2021/0166875 A1* | 6/2021 | Kang | H01G 4/12 |
| 2021/0202180 A1* | 7/2021 | Fukunaga | H01G 4/1209 |

FOREIGN PATENT DOCUMENTS

| | | |
|---|---|---|
| JP | 2019-212717 A | 12/2019 |
| JP | 2021-27094 A | 2/2021 |
| JP | 2021-027095 A | 2/2021 |
| JP | 2021-82686 A | 5/2021 |

\* cited by examiner

MULTILAYER CAPACITOR

CROSS-REFERENCE TO RELATED APPLICATION(S)

This application claims the benefit of priority to Korean Patent Application No. 10-2021-0131027 filed on Oct. 1, 2021 in the Korean Intellectual Property Office, the disclosure of which is incorporated herein by reference in its entirety.

BACKGROUND

1. Technical Field

The present disclosure relates to a multilayer capacitor.

2. Description of Related Art

A capacitor is a device which may store electricity, and the electricity is accumulated in each of two electrodes of the capacitor generally when a voltage is applied to the capacitor in a state where the two electrodes are disposed opposite to each other. In a case where a direct current (DC) voltage is applied to the capacitor, a current flows in the capacitor while the electricity is accumulated in the capacitor. Meanwhile, in a case where an alternating current (AC) voltage is applied to the capacitor, an AC current flows in the capacitor while polarities of the electrodes are alternated with each other.

The capacitor may be classified into several types based on a type of an insulator positioned between the electrodes such as an aluminum electrolytic capacitor in which the electrodes are made of aluminum and a thin oxide film is disposed between these aluminum electrodes, a tantalum capacitor in which tantalum is used as an electrode material, a ceramic capacitor in which a dielectric material of a high dielectric constant such as a titanium barium is positioned between the electrodes, a multilayer ceramic capacitor (MLCC) in which ceramic of a high dielectric constant, formed in a multilayer structure, is used as a dielectric material positioned between the electrodes, a film capacitor in which a polystyrene film is used as a dielectric material positioned between the electrodes, etc.

Among these capacitors, the multilayer ceramic capacitor has excellent temperature and frequency characteristics and may be implemented in a small size, and has thus been recently used widely in various fields such as a high frequency circuit. In recent years, there have been continuous efforts to make the multilayer ceramic capacitor smaller, and the dielectric layer and the internal electrodes are made thinner to this end. In recent years, in a field of the multilayer capacitors, various efforts have been made to improve moisture resistance reliability of the multilayer capacitor by reducing defects occurring when moisture or plating solution infiltrates into the multilayer capacitor. As one method, either a cover layer of a capacitor body or an external electrode may be made thicker. However, the corresponding component may have an increased size, and the capacitor may have reduced capacitance, even with the same size.

SUMMARY

An aspect of the present disclosure may provide a multilayer capacitor having improved moisture resistance reliability. Another aspect of the present disclosure may provide a multilayer capacitor including an internal electrode having improved structural stability.

According to an aspect of the present disclosure, a multilayer capacitor includes a body including a dielectric layer and a plurality of internal electrodes stacked on one another with the dielectric layer interposed therebetween, and external electrodes disposed externally on the body, and respectively connected to the plurality of internal electrodes, wherein at least one of the plurality of internal electrodes includes an alloy region formed in a region in contact with a corresponding external electrode of the external electrodes, and the alloy region may include a nickel (Ni)-chromium (Cr) alloy.

The alloy region may further include at least one component selected from the group consisting of copper (Cu), tungsten (W), molybdenum (Mo), cobalt (Co) and aluminum (Al).

A length of the alloy region may be 9 μm or more and 20 μm or less, in which the length thereof is measured from a surface on which the alloy region is bonded to the corresponding external electrode.

The external electrodes may include first and second external electrodes respectively disposed on first and second surfaces of the body, opposite to each other.

A length of the alloy region may be 9 μm or more and 20 μm or less, in which the length thereof is measured in a direction in which the first and second external electrodes are disposed opposite to each other.

A region of the at least one of the plurality of internal electrodes other than the alloy region may have a lower content of Cr than the alloy region.

The region of the at least one of the plurality of internal electrodes other than the alloy region may include a Ni component, and the corresponding external electrode includes a Cu component.

The alloy region may include a Ni—Cu—Cr alloy.

In the alloy region, a content of Cr may be lowered as being farther away from the corresponding external electrode.

According to another aspect of the present disclosure, a multilayer capacitor includes a body including a dielectric layer and a plurality of internal electrodes stacked on one another with the dielectric layer interposed therebetween, and external electrodes disposed externally on the body, and respectively connected to the plurality of internal electrodes, wherein at least one of the plurality of internal electrodes includes an alloy region formed in a region in contact with a corresponding external electrode of the external electrodes, and a length of the alloy region is 9 μm or more and 20 μm or less, in which the length thereof is measured from a surface on which the alloy region is bonded to the corresponding external electrode.

The alloy region may include an alloy of Ni and at least one component selected from the group consisting of chromium (Cr), copper (Cu), tungsten (W), molybdenum (Mo), cobalt (Co) and aluminum (Al).

The alloy region may include a Ni component, and a remaining component of the alloy region other than the Ni component may be disposed on a same height level as the Ni component in a stacking direction.

An average thickness of the alloy region may be substantially the same as an average thickness of a remaining region of the at least one of the plurality of internal electrodes.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Figure 1:
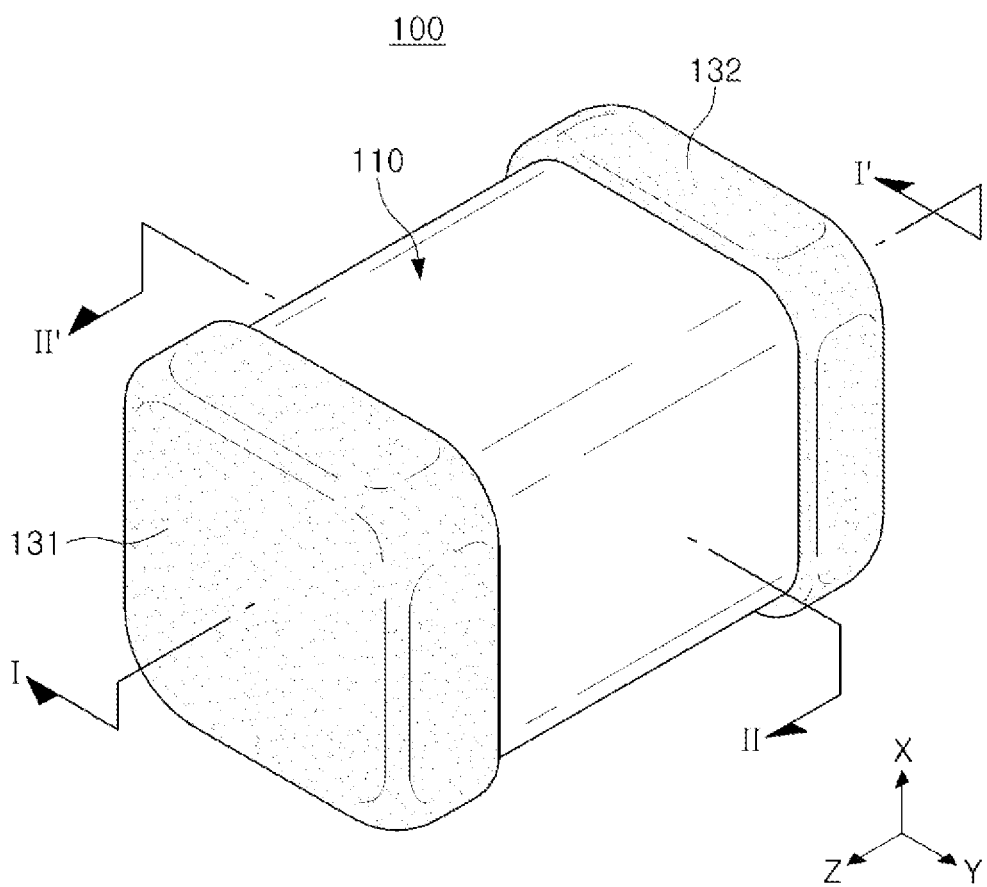
FIG. 1 is a perspective view schematically showing an appearance of a multilayer capacitor according to an exemplary embodiment of the present disclosure.
Figure 2:
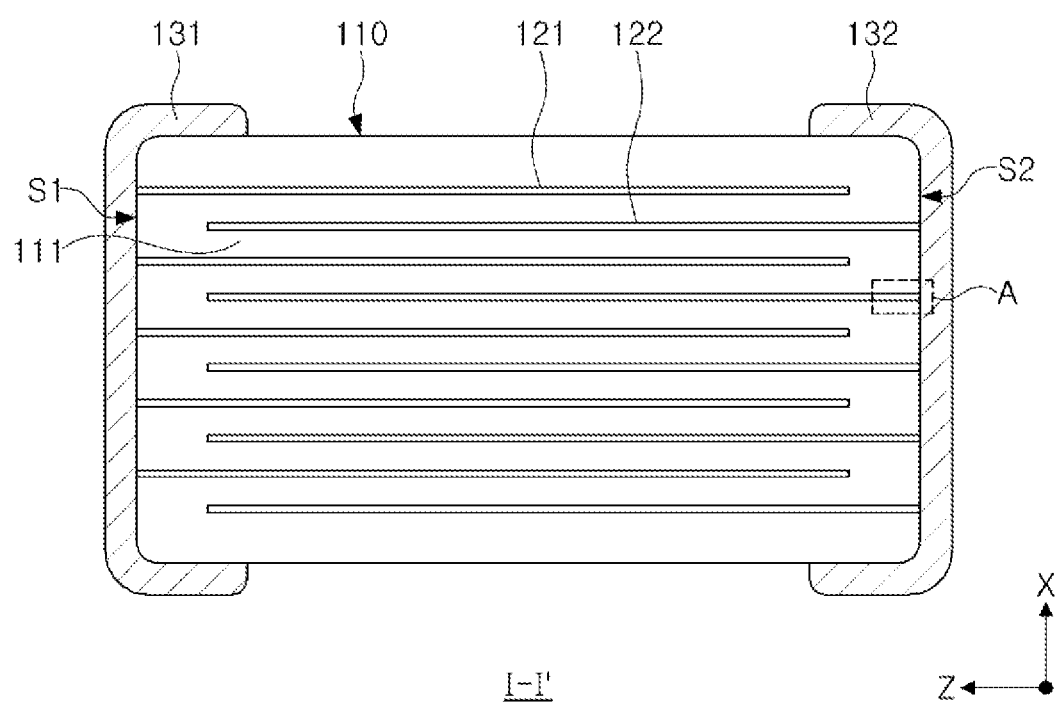
FIG. 2 is a cross-sectional view taken along line I-I' in the multilayer capacitor of FIG. 1.
Figure 3:
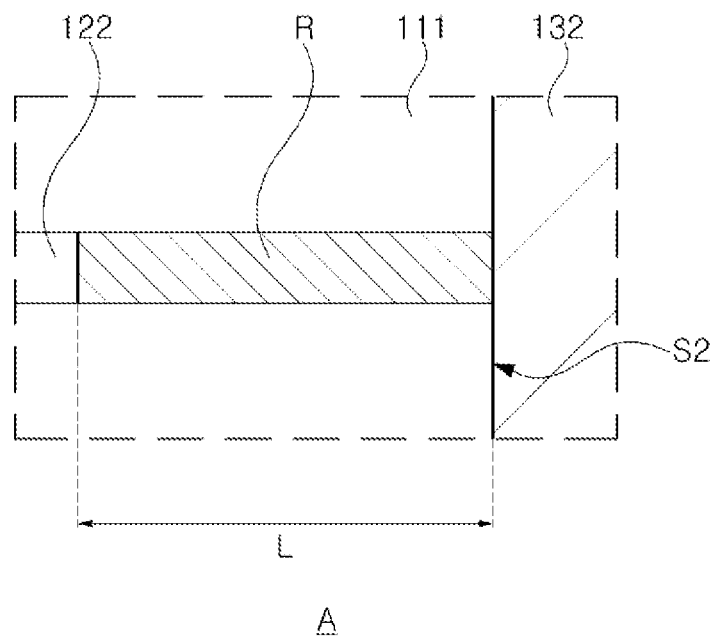
FIG. 3 is an enlarged view of a region A of FIG. 2.
Figure 4:
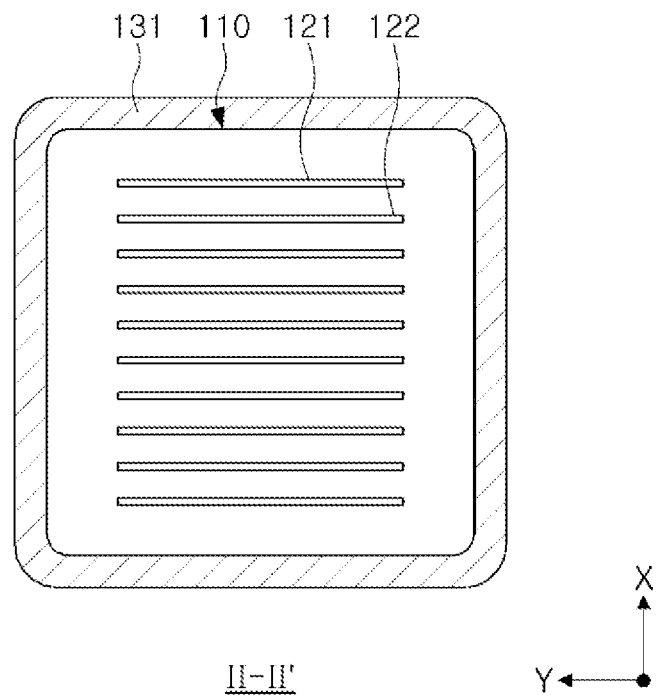
FIG. 4 is a cross-sectional view taken along line II-II' in the multilayer capacitor of FIG. 1.
Figure 5:
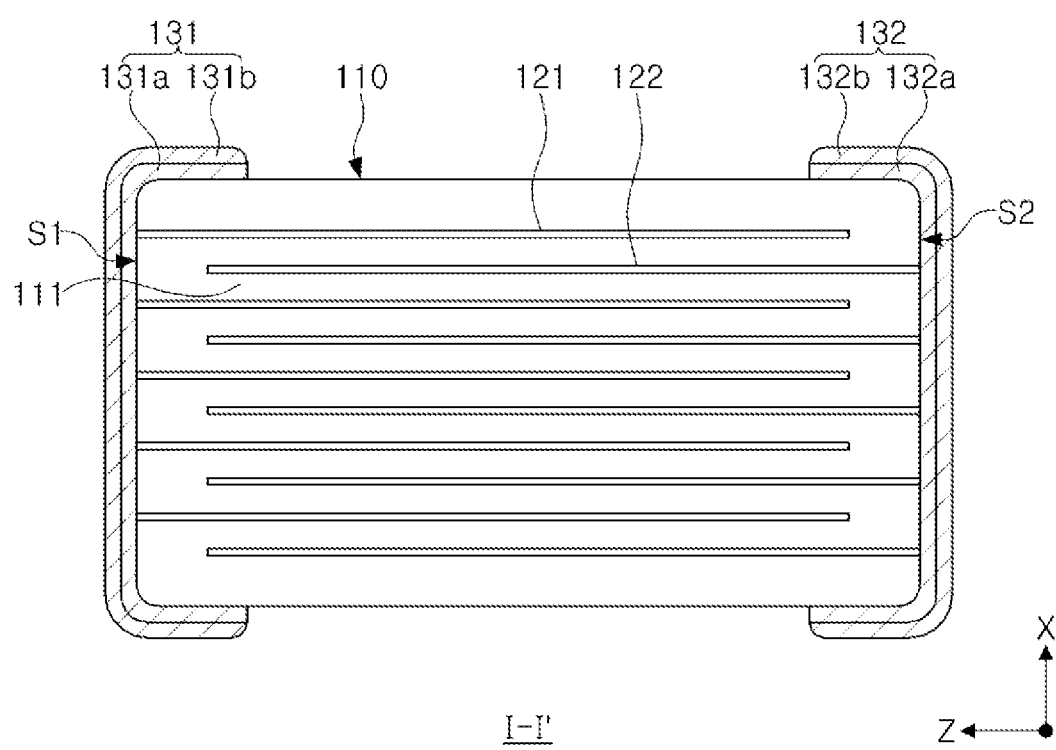
FIG. 5 shows a multilayer capacitor according to a modified example.

FIG. 1 is a perspective view schematically showing an appearance of a multilayer capacitor (MLCC) according to an exemplary embodiment of the present disclosure; FIG. 2 is a cross-sectional view taken along line I-I' in the multilayer capacitor of FIG. 1; FIG. 3 is an enlarged view of a region A of FIG. 2; FIG. 4 is a cross-sectional view taken along line II-II' in the multilayer capacitor of FIG. 1; and FIG. 5 shows a multilayer capacitor according to a modified example.

Referring to FIGS. 1 through 4, a multilayer capacitor 100 according to an exemplary embodiment of the present disclosure may include: a body 110 including a dielectric layer 111 and a plurality of internal electrodes 121 and 122 stacked on each other with the dielectric layer interposed therebetween; and external electrodes 131 and 132, wherein at least one of the plurality of internal electrodes 121 and 122 may include an alloy region R formed in each region in which the internal electrodes are in contact with the external electrodes 131 and 132, respectively, and here, the alloy region R may include a nickel (Ni)-chromium (Cr) alloy. The alloy region R each provided in the internal electrodes 121 and 122 may reduce infiltration of a plating solution, moisture or the like, and the capacitor may have improved moisture resistance characteristics and insulation resistance characteristics.

The body 110 may have a structure in which the plurality of dielectric layers 111 are stacked on each other in a first direction (i.e., X-direction) or a stacking direction, and may be obtained by stacking a plurality of green sheets on each other and then sintering the same for example. The plurality of dielectric layers 111 may have an integrated shape by this sintering process, and may include a plurality of grains G. In addition, as shown in FIG. 1, the body 110 may have a shape similar to a rectangular parallelepiped. The dielectric layer 111 included in the body 110 may include a ceramic material having a high dielectric constant, BT-based ceramics, i.e., barium titanate ($BaTiO_3$) based ceramics, for example, and may also include any other material known in the art as long as the capacitor obtains sufficient capacitance. The dielectric layer 111 may further contain an additive, an organic solvent, a plasticizer, a binder, a dispersant and the like, if necessary, in addition to the ceramic material which is a main component. Here, when using the additive, the dielectric layer may include the additive in the form of a metal oxide during its manufacturing process. The metal oxide additive may include, for example, at least one of manganese dioxide ($MnO_2$), dysprosium oxide ($Dy_2O_3$), barium oxide (BaO), magnesium oxide (MgO), aluminium oxide ($Al_2O_3$), silicon dioxide ($SiO_2$), chromium(III) oxide ($Cr_2O_3$) and calcium carbonate ($CaCO_3$).

The plurality of internal electrodes 121 and 122 may be obtained by printing a paste, which includes a conductive metal having a predetermined thickness, on one surface of a ceramic green sheet and then firing the same. In this case, the plurality of internal electrodes 121 and 121 may respectively be first and second internal electrodes 121 and 122 exposed from the body 110 in directions opposite to each other. The first and second internal electrodes 121 and 122 may respectively be connected to different external electrodes 131 and 132, may have different polarities while being driven, and may be electrically isolated from each other by the dielectric layer 111 disposed therebetween. However, the number of the external electrodes 131 and 132 or a method in which the external electrodes 131 and 132 and the internal electrodes 121 and 121 are respectively connected to each other may depend on exemplary embodiments.

The external electrodes 131 and 132 may be formed externally on the body 110. In detail, the external electrodes 131 and 132 may be first and second external electrodes 131 and 132 respectively disposed on first and second surfaces S1 and S2 of the body 110, opposite to each other. The first and second external electrodes 131 and 132 may respectively be connected to the first and second internal electrodes 121 and 122. The external electrodes 131 and 132 may be formed by making the paste of a material including a conductive metal and then applying the same to the body 110 or the like, and the conductive metal may be, for example, chromium (Cr), copper (Cu), nickel (Ni), palladium (Pd), gold (Au) or an alloy thereof. Meanwhile, as shown in the modified example of FIG. 5, the external electrodes 131 and 132 may have a multi-layered structure, and first layers 131a and 132a may each have the above-described structure including Cr, Cu, Ni, Pd, Au or the like, and second layers 131b and 132b may each include a plating layer including Ni, tin (Sn) or the like.

Referring to FIG. 3, in this exemplary embodiment, at least one of the internal electrodes 121 and 122 may include the alloy region R formed in each region in which the internal electrodes 121 and 122 are in contact with the external electrodes 131 and 132. In this case, the alloy region R may include the Ni—Cr alloy. In this case, a region of the internal electrode 121 or 122 other than the alloy region R may have a lower content of Cr than the alloy region R. According to various aspects of the present disclosure, when the internal electrode 121 or 122 includes an alloy region of Ni, it is possible to reduce external hydrogen (H) from infiltrating into the capacitor. Among the metals that may form their alloys with Ni, Cr may be suitable for reducing hydrogen diffusion, which is because the solubility of hydrogen is low and the bonding strength with hydrogen is high. In this way, it is possible to form the alloy region R including the Ni—Cr alloy at each boundary region between the internal electrodes 121 and 122 and the external electrodes 131 and 132, thereby minimizing an influence of plating solution or moisture, and improving moisture resistance reliability. The alloy region R may be formed in the internal electrode 121 or 122, thereby obtaining another additional structure having improved moisture resistance, for example, sufficient moisture resistance reliability without further employing a protective layer or the like, on the surface of the body 110 or that of the external electrode 131 or 132.

The Ni component of the alloy region R may be a component already exists in the internal electrode 121 or 122 by being previously added in the conductive paste, and the Cr component may be a component diffused from the external electrode 131 or 132. Accordingly, the alloy region R may include a lower content of Cr as being farther from the external electrode 131 or 132. In order for Cr to be diffused into the internal electrodes 121 and 122, the external electrodes 131 and 132 may include the Cr component, and may be implemented as Cr-fired electrodes, for example. In addition, the alloy region may further include at least one component selected from the group consisting of copper (Cu), tungsten (W), molybdenum (Mo), cobalt (Co) and aluminum (Al). As a specific example, the region of the internal electrode 121 or 122 other than the alloy region R may include the Ni component, and the external electrode 131 or 132 may include the Cu component. In this case, the alloy region R may include a Ni—Cu—Cr alloy. In addition, the region of the internal electrode 121 or 122 other than the alloy region R may include a lower content of Cr than the alloy region R.

In order to improve the moisture resistance reliability described above, it may be necessary to secure a sufficient length L of the alloy region R. In detail, the length L of the alloy region R may be 9 μm or more and 20 μm or less based on a length thereof measured from a surface (i.e., surface S2 in FIG. 3) on which the alloy region R is bonded to the external electrode 131 or 132. In this case, the length L of the alloy region R may be 9 μm or more and 20 μm or less based on a length thereof measured in a direction (i.e., Z direction) in which the first and second external electrodes 131 and 132 disposed opposite to each other. When the length L of the alloy region R is 9 μm or more, it is possible to sufficiently exhibit a performance to prevent the hydrogen infiltration, and when the alloy region R is excessively long to be more than 20 μm, the internal electrode 121 or 122 may have a reduced structural stability, thus having an increased probability that a crack occurs. When the length L of the alloy region R satisfies the condition of 9 μm or more and 20 μm or less, it is not necessary that the alloy region R includes the Ni—Cr alloy, and the alloy region R may obtain its intended effect such as the moisture resistance reliability even when including an alloy of other components.

According to one exemplary embodiment of the present disclosure, the moisture resistance characteristics may be measured based on the length L of the alloy region R. In detail, the length of the alloy region may be measured at an end of the Ni internal electrode of the MLCC designed to have X5R temperature characteristics and nominal capacitance of 15 μF and uses the Cr-fired electrodes as the external electrodes. Electron Probe Microanalysis (EPMA) is performed on a cross-section of a sample to check whether the alloy region is formed at the end of the internal electrode of the fabricated sample and to check a length thereof. Table 1 below shows a result of mapping the component of Cr in the sample measured at an acceleration voltage of 20 kV and a magnification of ×2,000, measuring the length (μm) of the Ni—Cr alloy region at four portions of the sample, and averaging the same. Here, the number of the portions of the sample selected for the measurement is not limited to four. In this case, the length of the alloy region may be adjusted by controlling the firing temperature of the external electrode, a size of the conductive particle, etc. For example, the external electrode may be fired at a relatively high temperature (about 700 to 750° C.) to sufficiently secure the length of the alloy region to 9 μm or more. In addition, for example, the alloy region may be a region including 10% or more of Cr compared to the maximum intensity of Cr included in the external electrode, and the length of the alloy region may be measured, which are obtained by using the EPMA mapping.

TABLE 1

|  | Sample A | Sample B | Sample C | Sample D | Sample E | Sample F | Sample G |
| --- | --- | --- | --- | --- | --- | --- | --- |
| #1 | 6.51 | 9.99 | 9.3 | 9.12 | 7.67 | 19.36 | 18.46 |
| #2 | 6.10 | 8.68 | 5.72 | 8.27 | 9.53 | 18.87 | 20.94 |
| #3 | 6.78 | 7.38 | 8.23 | 6.79 | 9.35 | 19.97 | 20.40 |
| #4 | 7.94 | 5.34 | 9.42 | 8.98 | 9.85 | 19.12 | 21.84 |
| Average | 6.83 | 7.85 | 8.17 | 8.29 | 9.10 | 19.33 | 20.41 |

The above samples are plated, and a highly accelerated life test (HALT) evaluation is performed to compare degrees of their reduced insulation resistances by the hydrogen infiltration. In detail, a voltage is applied to the samples at 105° C. and for 4 hours. Then, a ratio of the samples each having an insulation resistance reduced by 1/100 or more than their initial insulation resistances is then defined as a reduction rate, and this reduction rate is shown in Table 2 below.

TABLE 2

|  | Sample A | Sample B | Sample C | Sample D | Sample E | Sample F | Sample G |
| --- | --- | --- | --- | --- | --- | --- | --- |
| Reduction No./Evaluation No. | 6/400 | 2/400 | 4/400 | 3/400 | 0/400 | 0/400 | 0/400 |
| Reduction rate (%) | 1.5 | 0.5 | 1 | 0.75 | 0 | 0 | 0 |

According to the above experimental result, there is no reduction in the insulation resistance of the sample (E, F or G) including the alloy region whose length is 9 μm or more, unlike the sample (A, B, C or D) including the alloy region whose length is less than 9 μm. However, the sample G including the alloy region whose length is 20 μm or more may have a micro-crack occurring in the internal electrode due to an excessive amount of alloy, and may thus have lower reliability when used for a long period of time. Comprehensively considering these results, when the alloy region R includes the Ni—Cr alloy, the capacitor may have improved moisture resistance characteristics due to the reduced hydrogen infiltration. In addition, when the length (L) of the alloy region R is adjusted to the level of 9-20 μm, the capacitor may secure sufficient moisture resistance characteristics and minimized probability that the crack occurs in the internal electrode.

In one exemplary embodiment of the present disclosure, a remaining component of the alloy region R other than the Ni component may be disposed on a same height level as the Ni component in the first direction (e.g., X direction) or the stacking direction.

According to one exemplary embodiment, an average thickness of the alloy region R, may be substantially the same as an average thickness of the region of the internal electrode 121 or 122 other than the alloy region R.

One or ordinary skill in the art would understand that the expression "substantially the same" refers to being the same by allowing process errors, positional deviations, and/or measurement errors that may occur in a manufacturing process, and the range thereof may be widely accepted in the art (for example, 5%, but not limited thereto).

In one example, a thickness of an element may mean a dimension of the element in a direction perpendicular to a planar surface of the element. The thickness of the element may be any one of an average thickness, a maximum thickness, a minimum thickness, or a thickness of the element measured in a predetermined region, unless contradictory to another definition explicitly described. In one example, the thickness of the element may be determined by defining a predetermined number (e.g., 5) of points to the left and the predetermined number (e.g., 5) of points to the right from a reference center point of the element at equal intervals (or non-equal intervals, alternatively), measuring a thickness of each of the points at equal intervals (or non-equal intervals, alternatively), and obtaining an average value therefrom. Alternatively, the thickness may be the maximum thickness or the minimum thickness of the multiple measurements. Alternatively, the thickness may be a thickness of the reference center point in the measured region. In one example, an optical microscope or a scanning electron microscope (SEM) may be used in the measurement, although the present disclosure is not limited thereto. Other measurement methods and/or tools appreciated by one of ordinary skill in the art, even if not described in the present disclosure, may also be used.

As set forth above, the multilayer capacitor according to an exemplary embodiment of the present disclosure may have at least one improved characteristics such as the moisture resistance reliability, structural stability, etc.

While the exemplary embodiments have been shown and described above, it will be apparent to those skilled in the art that modifications and variations could be made without departing from the scope of the present disclosure as defined by the appended claims.

What is claimed is:

1. A multilayer capacitor comprising:
   a body including a dielectric layer and a plurality of internal electrodes stacked on one another with the dielectric layer interposed therebetween; and
   external electrodes disposed externally on the body, and respectively connected to the plurality of internal electrodes,
   wherein at least one of the plurality of internal electrodes includes an alloy region formed in a region in contact with a corresponding external electrode of the external electrodes, and the alloy region includes a nickel (Ni)-chromium (Cr) alloy, and
   a region of the at least one of the plurality of internal electrodes other than the alloy region has a lower content of Cr than the alloy region.

2. The multilayer capacitor of claim 1, wherein the alloy region further includes at least one component selected from the group consisting of copper (Cu), tungsten (W), molybdenum (Mo), cobalt (Co) and aluminum (Al).

3. The multilayer capacitor of claim 1, wherein a length of the alloy region is 9 μm or more and 20 μm or less, wherein the length thereof is measured from a surface on which the alloy region is bonded to the corresponding external electrode.

4. The multilayer capacitor of claim 1, wherein the external electrodes include first and second external electrodes respectively disposed on first and second surfaces of the body, opposite to each other.

5. The multilayer capacitor of claim 4, wherein a length of the alloy region is 9 μm or more and 20 μm or less, wherein the length thereof is measured in a direction in which the first and second external electrodes are disposed opposite to each other.

6. The multilayer capacitor of claim 1, wherein the region of the at least one of the plurality of internal electrodes other than the alloy region includes a Ni component, and the corresponding external electrode includes a Cu component.

7. The multilayer capacitor of claim 6, wherein the alloy region includes a Ni-Cu—Cr alloy.

8. The multilayer capacitor of claim 1, wherein, in the alloy region, a content of Cr is lowered as being farther away from the corresponding external electrode.

9. A multilayer capacitor comprising:
   a body including a dielectric layer and a plurality of internal electrodes stacked on one another with the dielectric layer interposed therebetween; and
   external electrodes disposed externally on the body, and respectively connected to the plurality of internal electrodes,
   wherein at least one of the plurality of internal electrodes includes an alloy region formed in a region in contact with a corresponding external electrode of the external electrodes,
   a length of the alloy region is 9 μm or more and 20 μm or less, wherein the length thereof is measured from a surface on which the alloy region is bonded to the correspoinding corresponding external electrode, and
   the alloy region includes a Ni component, and a remaining component of the alloy region other than the Ni component is present in greater amounts in the alloy region than a remaining region of the at least one of the plurality of internal electrodes other than the alloy region.

10. The multilayer capacitor of claim 9, wherein the remaining component of the alloy region includes at least one component selected from the group consisting of chromium (Cr), copper (Cu), tungsten (W), molybdenum (Mo), cobalt (Co) and aluminum (Al).

11. The multilayer capacitor of claim 9, wherein the remaining component of the alloy region other than the Ni component is disposed on a same height level as the Ni component in a stacking direction.

12. The multilayer capacitor of claim 9, wherein an average thickness of the alloy region is substantially the same as an average thickness of the remaining region of the at least one of the plurality of internal electrodes.

13. A multilayer capacitor comprising:
   a body including a dielectric layer and a plurality of internal electrodes stacked on one another with the dielectric layer interposed therebetween; and external electrodes disposed externally on the body, and respectively connected to the plurality of internal electrodes, wherein at least one of the plurality of internal electrodes includes an alloy region formed in a region in contact with a corresponding external electrode of the external electrodes, and the alloy region includes a nickel (Ni)-chromium (Cr) alloy, and in the alloy region, a content of Cr is lowered as being farther away from the corresponding external electrode.

* * * * *